US006456135B1

(12) United States Patent
Albean

(10) Patent No.: US 6,456,135 B1
(45) Date of Patent: Sep. 24, 2002

(54) SYSTEM AND METHOD FOR SINGLE PIN RESET A MIXED SIGNAL INTEGRATED CIRCUIT

(75) Inventor: David Lawrence Albean, Indianapolis, IN (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/666,021

(22) Filed: Sep. 19, 2000

(51) Int. Cl.[7] ................................................ H03K 3/02
(52) U.S. Cl. ........................ 327/198; 327/142; 327/147; 327/150
(58) Field of Search ................................. 327/142, 143, 327/198, 147, 150, 154, 564, 565; 331/DIG. 3, 185

(56) References Cited

U.S. PATENT DOCUMENTS

| 4,254,347 | A | * | 3/1981 | Ray ........................... 327/142 |
| 5,175,511 | A | * | 12/1992 | Fujiwara ..................... 331/18 |
| 5,349,244 | A | * | 9/1994 | Confalonieri ............... 327/142 |
| 5,917,367 | A | * | 6/1999 | Woo ........................... 327/537 |

FOREIGN PATENT DOCUMENTS

| JP | 06152412 | 5/1994 | ............ H03M/1/10 |
| JP | 07298204 | 11/1995 | ............ H04N/7/01 |

OTHER PUBLICATIONS

* abstract in English and Japanese text of the patent application are enclosed.

** abstract in English and Japanese text of the patent application are enclosed.

* cited by examiner

Primary Examiner—Timothy P. Callahan
Assistant Examiner—An T. Luu
(74) Attorney, Agent, or Firm—Joseph S. Tripoli; Robert D. Shedd

(57) ABSTRACT

A system and method is described for providing a single pin reset for a mixed signal integrated circuit. The system and method provides for a single reset signal/pin of the integrated circuit to be utilized to generate all internal resets for the analog and digital circuitry/sections of the mixed signal integrated circuit. In one form, a state machine generates a reset signal for a phase locked loop synthesizer that is utilized to generate internal system clocks for the analog and digital circuitry, as well as a digital reset signal that provides reset signals to the various digital sections circuitry of the integrated circuit. Preferably, the chip reset signal is provided for a longer period of time than the PLL reset signal in order to assure that the PLL is running and generating clocking signals before the digital logic is clocked.

24 Claims, 4 Drawing Sheets

SYSTEM AND METHOD FOR SINGLE PIN RESET A MIXED SIGNAL INTEGRATED CIRCUIT

FIELD OF THE INVENTION

The present invention relates to integrated circuit chips and, more particularly, to mixed signal integrated circuit chips.

BACKGROUND OF THE INVENTION

Integrated circuits or ICs are extensively used in all types of today's electronic devices. One trend in IC design and manufacturing is the miniaturization of the various components of an IC. Another trend in IC design and manufacturing is the consolidation of functionality traditionally provided by several ICs into one IC. By consolidating functionality into fewer and fewer ICs combined with the continued trend in miniaturization, the overall physical space occupied by such an IC within an electronic device is reduced. Such reduction also reduces the overall size of the electronic device. The consolidation of functionality is typically accomplished by combining same signal type circuits since most electronic devices utilize the same type of signals. This is not, however, always the case as a few electronic devices benefit from the consolidation of functionality of different signal sections.

One class of electronic devices is television signal processing devices. Television programming for the home viewer is available from many sources such as, terrestrial broadcasting, cable (CATV) distribution, satellite broadcasting (e.g. DBS) or the like. The television programming, in the form of television signals, may be provided in an analog and/or digital format. Depending on the transmitting medium, the analog and digital formats may vary. For example, different modulating schemes may be used for transmitting digital television signals. Various television signal processing devices such as televisions, set-top boxes, and the like must be able to process both analog and digital television signals and their attendant formats.

ICs for dual function analog and digital television signals are thus typically designed to have either analog signal circuits for processing analog signals and digital signal circuits for processing digital signals. However, in keeping with the trend for miniaturization and consolidation of functionality, television signal processing ICs for dual function analog and digital television signal processing include analog and digital circuitry for the analog and digital signals. ICs utilizing both analog and digital signals are termed mixed signal ICs.

All ICs have a plurality of pins or terminals for input and output (I/O). Some of the pins are dedicated to resetting various circuits of the IC for synchronization. A problem with mixed signal ICs is that several I/O pins of the plurality of I/O pins are necessary in order to provide signals to reset both the analog circuitry and the digital circuitry. Since it is desirable to reduce the overall number of I/O pins in an IC, it is desirable to utilize, and thus have, only one reset I/O pin for a mixed signal IC.

SUMMARY OF THE INVENTION

The present invention is a system and method for resetting both the analog and digital circuits of a mixed signal integrated circuit utilizing a single reset pin/signal.

In one form, the present invention is an integrated circuit having a first section for processing an analog signal and a second section for processing a digital section. A single input pin is operable to provide a single pin reset signal to the integrated circuit for activating a reset condition of both the first and second sections and for terminating the reset condition of both the first and second sections.

In another form, the present invention is a method for resetting an integrated circuit. The method includes: a) providing a reset signal to the integrated circuit via a single input pin; b) activating a reset condition in an analog signal processing section of the integrated circuit in response to the reset signal; c) activating a reset condition in a digital signal processing section of the integrated circuit in response to the reset signal; d) terminating the reset condition of the analog signal processing section in response to the reset signal; and e) terminating the reset condition of the digital signal processing section in response to the reset signal.

BRIEF DESCRIPTION OF THE DRAWINGS

Reference to the following description of the present invention should be taken in conjunction with the accompanying drawings, wherein.

Corresponding reference characters indicate corresponding parts throughout the several views.

DETAILED DESCRIPTION OF THE INVENTION

Figure 1:
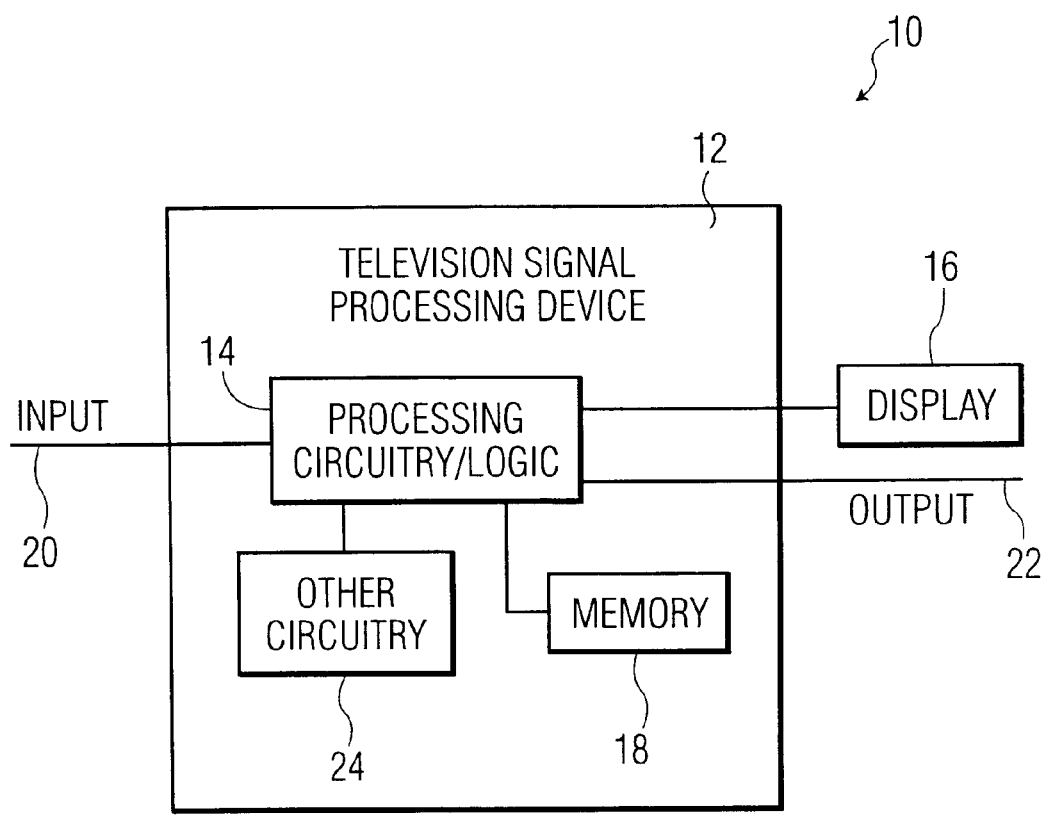
FIG. 1 is a block diagram of an exemplary television signal processing device in which a mixed signal integrated circuit chip having the present invention may be utilized.

With reference to FIG. 1, there is depicted a system, generally designated 10, in which a mixed signal IC having the present invention may be utilized. It should be appreciated that the system 10 and the various components thereof are only exemplary of an environment/application in which the present invention may be utilized. Specifically, the present invention is utilized in a mixed signal (i.e. includes both analog and digital circuitry/logic) integrated circuit (IC) or IC chip. The mixed signal IC chip in which the present invention is utilized may take many forms and/or perform many functions. In the present exemplary case, the mixed signal IC chip provides television signal processing for a variety of formats of television signals from a variety of sources. The mixed signal television signal processor IC is adapted/operable (i.e. includes appropriate circuitry/logic) to provide satellite television (digital) signal processing, terrestrial (including cable distribution) digital television signal processing, and terrestrial (including cable distribution) analog television signal processing in addition to other associated television signal processing. These analog and digital signals may be provided in various formats and modulation schemes. Of course, mixed signal ICs that are adapted to perform other functions may utilize the principles presented herein.

In one form, the system 10 includes a television signal processing device 12 such as a television apparatus, a set-top box, or the like. The television signal processing device 12 includes processing circuitry/logic 14 that receives a television signal via an input 20. The television signal may be digital or analog, and may be in any type of format and modulation scheme. The television signal processing device 12 also typically includes memory 18 in which is stored program instructions for controlling the operation of the television signal processing device 12. Other circuitry/logic 24 is provided for other functionality of the television signal processing device 12 which represents all of the other necessary and/or appropriate circuitry/logic required for operation. Since the other circuitry/logic 24 is not necessary for understanding or practicing the present invention, it will not be described in detail.

The system 10 also includes a display 16 that is shown coupled to the processing circuitry/logic 14. The display 16 may be any type of display for showing the video portion of the television signal (and any OSD thereof) and may be integral to the television signal processing device, such as in a television, or may not be integral to the television signal processing device 12, such as in a set-top box, the set-top box being a television signal processing device 12 with the display 16 being associated with a television. An output 22 may also be provided to supply audio and/or video from the processed television signal to another device.

In one form, the television signal processing device 12 may be an analog/digital television, an all digital television such as a high definition digital television (HDTV), a set-top box capable of utilizing analog/digital television signals, a television signal storage device, or any other component that utilizes various forms of television signals. The television signal processing device 12 is also representative of any type of electronic device that may utilize a mixed signal integrated circuit (IC) or integrated circuit chip ("IC chip"). Thus, it should be appreciated that while a television signal processing device is discussed herein, the principles of the present invention may be applied to any type of electronic device.

The signal source for the input 20 may be any type of television signal receptor/source such as a terrestrial antenna for digital and/or analog television signals, a direct broadcast satellite (DBS) dish, a cable television system (CATV), or the like. Thus, the television signal may be digital or analog. The television signal typically includes a plurality of channels of audio and video information. As well, the television signal typically includes auxiliary data such as content ratings for the various programs on each channel. In the case of another type of device, the signal source may be any signal source.

The processing circuitry/logic 14 includes a number of integrated circuit chips each of which performs particular functions for the overall operation of the television signal processing device 12. Many of the ICs of the processing circuitry/logic 14 perform a multitude of related functions, such as digital processing of various aspects of the input signal. As well, the ICs may perform analog processing of various aspects of the input signal. Some of these ICs are mixed signal ICs while some are not. One type of mixed signal IC utilized in the processing circuitry/logic 14 is known as a Universal Link IC. The Universal Link IC is an integrated circuit chip of mixed signal design, i.e. both analog and digital circuitry, that incorporates or integrates several signal processing functions into a single IC chip or package. The Universal Link IC is utilized in televisions, set-top boxes, and other similar devices that utilize/process television signals that may be analog and/or digital.

In the present case, the Universal Link IC includes a "Satlink" section for demodulating satellite television signals, a "VSB (Vestigal SideBand) link" section for demodulating HDTV signals (that can be any type of digital modulation link section), and a "DCD" section that provides switching, chroma demodulation, and other signal processing of NTSC (analog) signals. Thus, the Universal Link IC is utilized within the processing circuitry/logic 14 to perform a variety of functions and includes a plurality of I/O pins in the same manner as other ICs. It should be appreciated that the Universal Link IC is only representative of a mixed signal integrated circuit chip and that the principles presented herein are applicable to all types of mixed signal integrated circuit chips.

Figure 2:
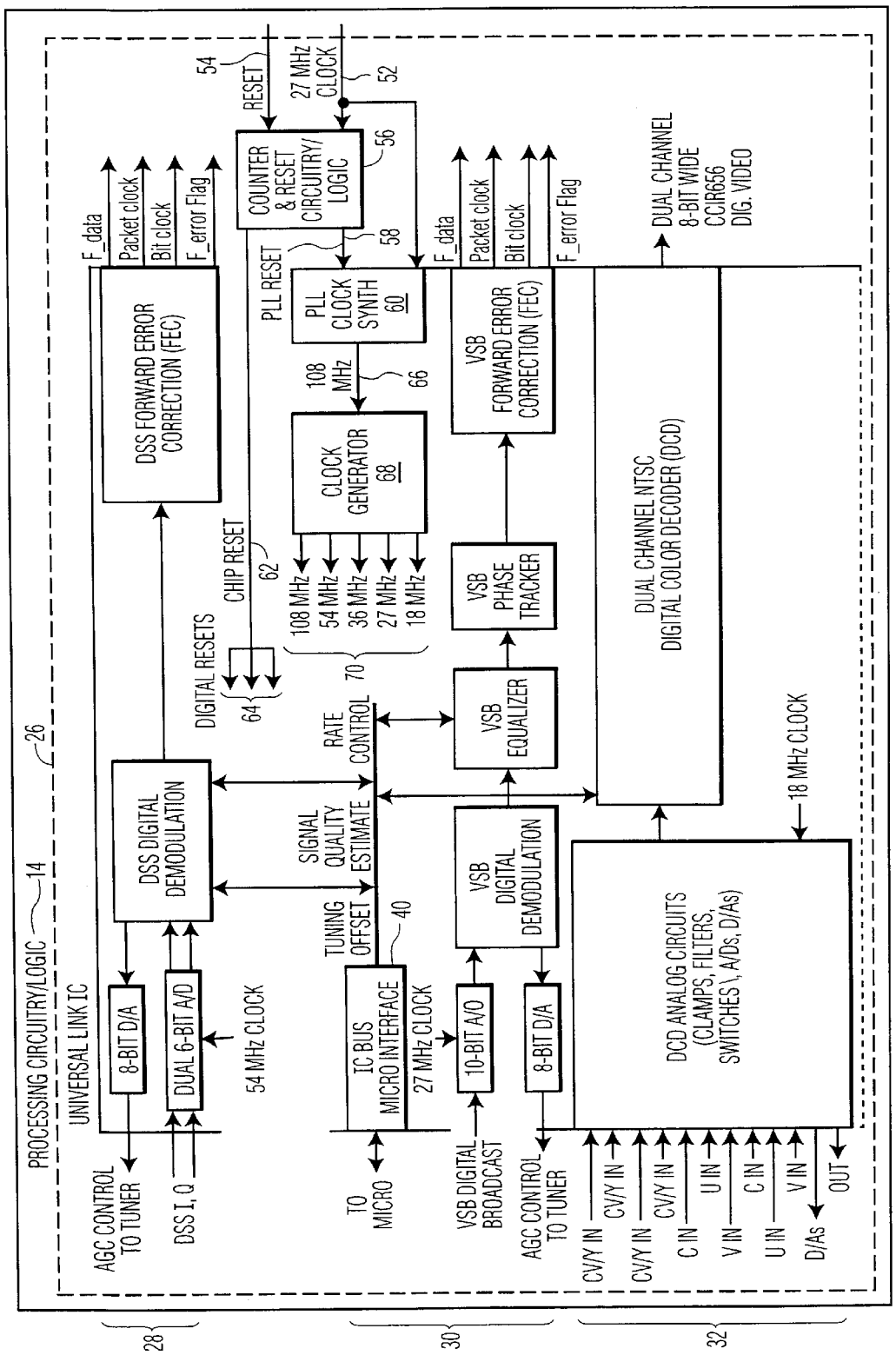
FIG. 2 is an upper level block diagram of a mixed signal IC utilized in the processing circuit/logic portion of the television signal processing device of FIG. 1 incorporating an embodiment of the present invention.

Referring to FIG. 2, the processing circuitry/logic 14 is shown with an upper level block diagram of a mixed signal IC, here a Universal Link IC, generally designated 26. As indicated above, the Universal Link IC 26 includes three main sections, namely a "Satlink" section for demodulating satellite television signals, generally designated 28, a "VSB (Vestigal SideBand) link" section for demodulating HDTV signals (that can be any type of digital modulation link section), generally designated 30, and a "DCD" section that provides switching, chroma demodulation, and other signal processing of NTSC (analog) signals, generally designated 32. These sections operate independently and in parallel but are supported by a common clock generator 68 that generates a plurality of IC clocks 70, and an I2C bus interface 40. The plurality of IC clocks 70 are utilized to clock the various sections of the Universal Link IC 26. The Universal Link IC 26 also includes a plurality of I/O (Input/Output) pins, some of which are labeled by text in FIG. 2. The I/O pins extend to the exterior of the IC package or chip. The various digital sections of the Universal Link IC 26 require clocking by one of the plurality of IC clocks 70 and include an asynchronous reset terminal. Each digital section requires a reset signal in order to put the digital section in a proper start-up state. As well, an analog Phase Locked Loop synthesizer 60 has a reset terminal that requires a reset signal to operate properly.

In FIG. 2, one of the I/O pins, designated 54, is an asynchronous reset input pin that is adapted to receive a reset signal from the processing circuitry/logic 14 or other source. Another one of the I/O pins, generally designated 52, is an clock input pin that is adapted to receive a clock signal for generating various internal system clocks for the various circuitry/logic thereof. In this case, the clock is a 27 MHz clock signal that is split to provide the 27 MHz signal to the analog PLL (Phase Locked Loop) Clock Synthesizer section 60 and a counter and reset circuitry/logic section 56. The counter and reset circuitry/logic section 56 is provided in accordance with the principles of the present invention and will be discussed in more detail below.

The 27 MHz clock input signal on the clock pin 52 clocks the counter portion of the counter and reset circuitry logic section 56, while at the same time clocks the PLL clock synthesizer 60. During normal operation (i.e. when there is no reset signal applied to the reset pin 54) the 27 MHz clock signal drives the PLL clock synthesizer 60 which provides a clock generation signal on a PLL output clock line 66 to drive a clock generator 68. The clock generator 68 is operable to generate a plurality of output clocks 70 to drive the various circuitry/logic of the Universal Link IC 26. In the present example, the PLL clock synthesizer 60 provides an 108 MHz output clock signal for the clock generator 68 which provides five output clocks of varying frequency (i.e. 108 MHz, 54 MHz, 36 MHz, 27 MHz, and 18 MHz). The internal clocks of the Universal Link IC 26 have their active edges synchronized with the incoming 27 MHz master clock signal.

The reset pin 54 is operable to receive an appropriate reset signal upon a condition such as start-up of the electronic device and/or the Universal Link IC 26 itself. In the present case, an appropriate reset signal is a low going pulse, but may be adapted to be any type of pulse or signal that accomplishes the same objective. Once a low going pulse reset signal is applied to the reset pin 54, the counter and reset circuitry/logic section 56 generates a PLL reset signal of a predetermined period of time that is supplied to the PLL clock synthesizer 60 via PLL reset line 58. At the same time, the counter and reset circuitry/logic section 56 generates a chip reset (digital reset) signal for the digital circuits/sections of a predetermined period of time that is supplied to the various digital circuits/sections represented by the plurality of digital resets 64. During the time that the PLL reset signal 84 is applied to the PLL clock synthesizer 60, the PLL clock synthesizer 60 will not generate the PLL clock signal on the PLL clock line 66 for the clock generator 68. Likewise, during the time that the chip reset signal 88 is applied to the chip resets 64 (which are coupled to various digital circuitry sections (the connections of which are not shown), the digital circuitry sections are idle. The PLL reset signal is then de-asserted which allows the PLL clock synthesizer 60 to begin generating a clock signal for the clock generator 68. The chip reset signal is then de-asserted after a predetermined time after the PLL reset signal is de-asserted which allows the digital circuits/sections to begin operation in their start-up state. The chip reset signal is de-asserted after a predetermined time period after the de-assertion of the PLL reset signal in order to assure that the PLL clock synthesizer 60 is running and generating a clock signal for the clock generator 68 before the digital circuitry/logic of the digital sections is clocked.

Thus, a system is described for the generation of proper internal reset signals for the analog and digital circuitry of the Universal Link IC (i.e. a mixed signal IC) from a single, external reset signal on a single reset I/O pin/terminal. The described system may be considered to be a simple state machine and may be implemented as such.

Figure 3:
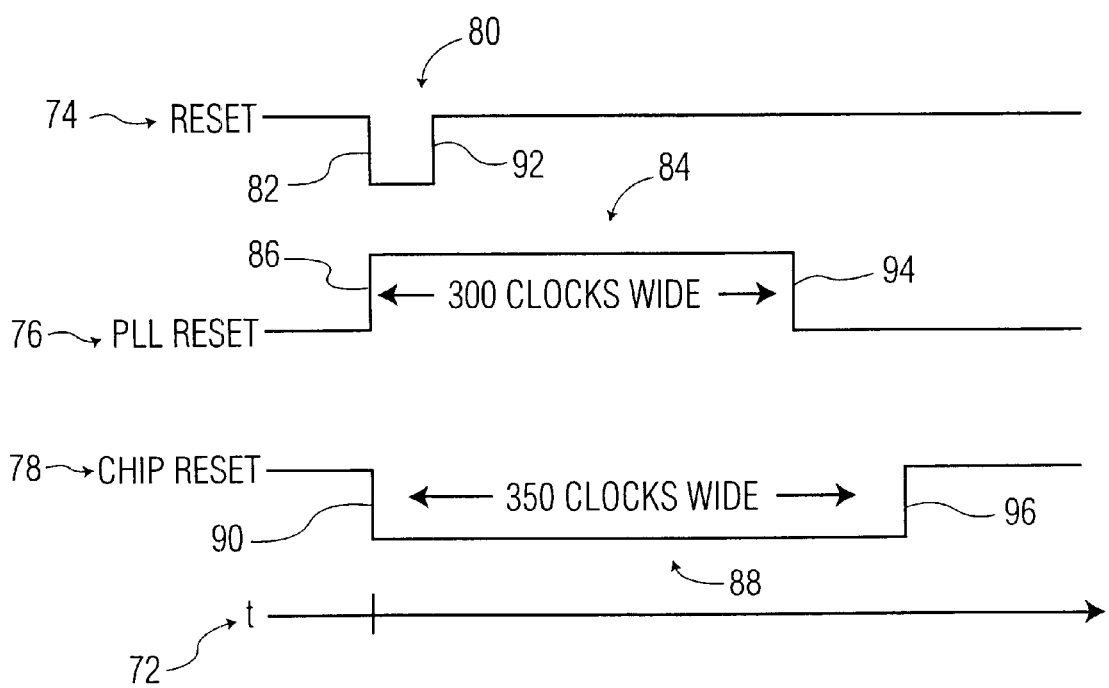
FIG. 3 is an exemplary timing diagram for the embodiment of present invention of FIG. 2.

An exemplary timing chart for the generation of the PLL reset signal and the chip reset signal in relation to the master reset signal along a time reference generally designated 72 in accordance with the principles of the present invention is shown in FIG. 3, and reference is now made thereto. The master reset signal is generally designated 74. The PLL reset signal is generally designated 76. The chip reset signal is generally designated 78. When it is desired to reset the system, upon power-up, or in any instance where it is necessary to restart the various system clocks and circuitry, a low reset signal or pulse 80 is applied to the reset pin 54. The low reset signal 80 has a leading edge 82 that triggers the counter portion of the counter and reset circuitry/logic 56 to begin counting utilizing the master 27 MHz clock and produce a high PLL reset signal 84 having a leading edge 86 that is synchronized with the leading edge 82 of the reset signal 80, and produce a low chip reset signal 88 having a leading edge 90 that is synchronized with the leading edge 82 of the reset signal 80. The subsequent trailing edge 92 of the reset pulse indicating the end of the reset pulse 80 is of no consequence to the counter and reset circuitry/logic 56.

The leading edge 86 of the PLL reset signal 84 begins the period of time or duration in which the PLL clock synthesizer 60 is deactivated or caused not to produce an output clock signal on the PLL output line 66. As well, the leading edge 90 of the chip reset signal 88 begins the period of time or duration in which the various digital circuits to which the digital resets 64 are coupled to be idle or deactivated. As indicated above, the duration or period of time that the PLL reset signal 84 is active or applied is greater than the duration or period of time that the chip reset signal 88 is active or applied.

An exemplary period of time for the PLL reset signal 84 is 300 clocks wide while the exemplary period of time for the chip reset signal 88 is 350 clocks wide. The time difference between the duration of the PLL reset signal 84 and the chip reset signal 88 (here 50 clocks wide) allows that the PLL is running and providing for the generation of internal clocks before the digital logic is clocked. Thus, at the trailing edge 94 of the PLL reset signal 84, the PLL clock synthesizer 60 is allowed to begin generation of the PLL output clock on the PLL clock output line 66 which allow the clock generator 68 to begin generation of the various IC clocks 70. Later, when 50 clocks have elapsed after the trailing edge 94 of the PLL reset signal 84, the counter and reset circuitry/logic 56 de-asserts the chip reset signal 88, signified by the trailing edge 96. Thereafter, the various resets of the digital sections/circuitry are put into operation.

It should be appreciated that the time duration of the PLL reset signal and the time duration of the chip (digital) reset signal are essentially arbitrary. It is preferably only necessary for the digital reset signal to be longer in duration that the PLL reset signal. The total time duration of the PLL reset signal is arbitrary. The total time duration of the digital reset signal is also arbitrary. In one embodiment, the counter and reset circuitry/logic 56 is "hardwired" to provide a PLL reset signal of a first predetermined time period or duration and a digital reset signal of a second predetermined time period or duration that is greater than the first predetermined time period by some amount In another embodiment, the counter and reset circuitry/logic 56 may be programmable to provide a PLL reset signal of any duration and/or a digital reset signal of any duration. This may be implemented by providing a signal duration input to the counter and reset circuitry/logic 56 and then supplying a reset duration signal from a bus register in order to set a duration value. As well, the counter and reset circuitry/logic 56 may provide a choice between PLL reset signals of preset durations and/or provide a choice between digital reset signals of preset durations. This, again, may be implemented by providing a signal duration input to the counter and reset circuitry/logic 56 and then supplying a reset duration signal from a bus register in order to set a duration value. The signal duration input to the counter and reset circuitry/logic 56 may modify the modulus of the counter. Of course, other schemes may be provided in order to implement the programmable embodiments of the counter and reset circuitry/logic 56.

Operation

Figure 4:
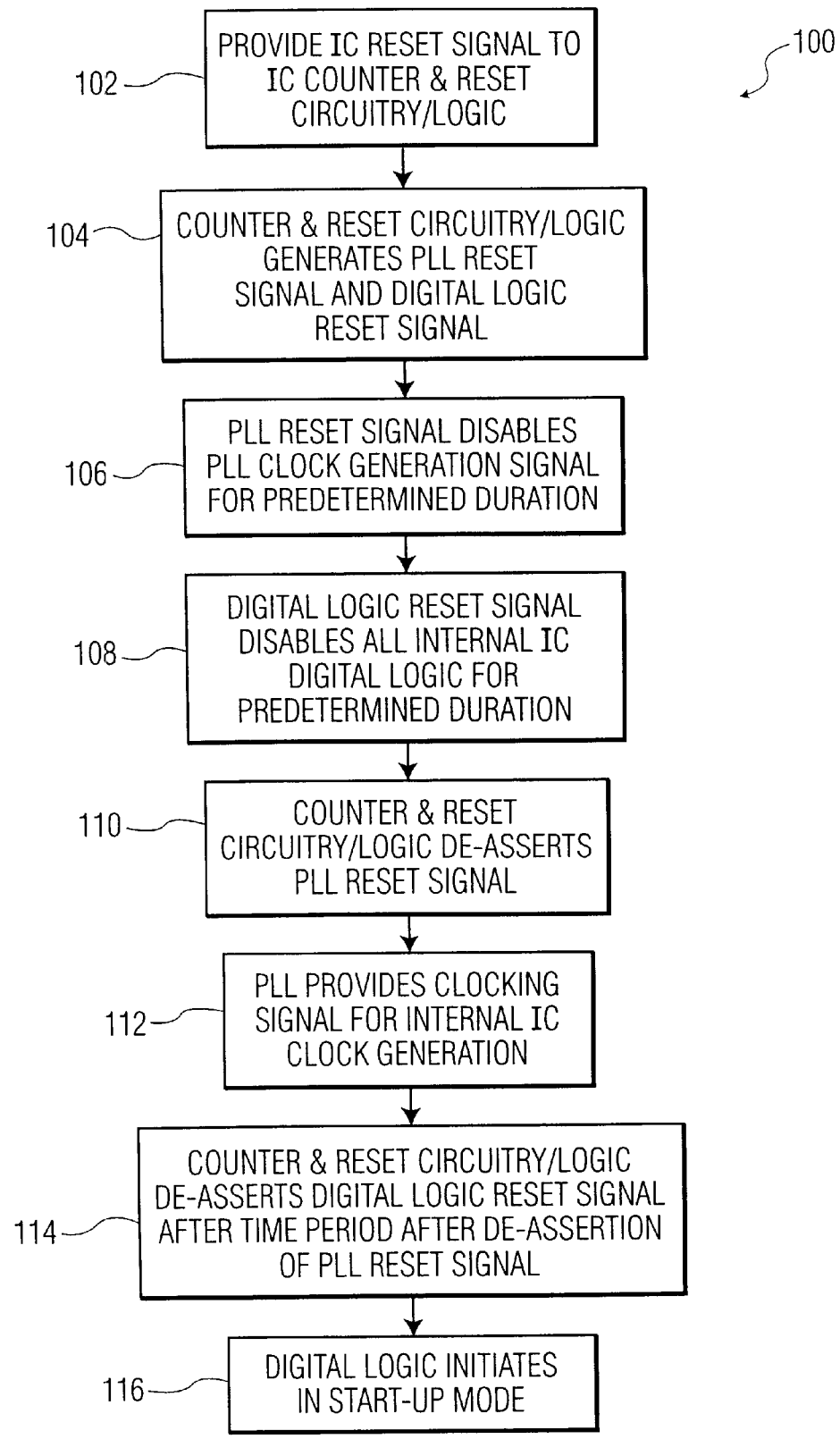
FIG. 4 is a flowchart of an exemplary method of providing a single pin reset system for a mixed signal IC in accordance with the present principles.

Next, a flowchart, generally designated 100, depicted in FIG. 4, is referenced to describe a method of use in accordance with the principles presented herein. Any instructions for the present method may be stored in and executed by the processing circuitry/logic 14. It should be appreciated that the flowchart 100 and the method described herein in association with the flowchart 100 is only exemplary of a method to carry out the principles presented herein.

Any software routines (i.e. instructions) may be implemented by any means as is known in the art, and in any programming language. Various programming approaches such as procedural, object oriented, or artificial intelligence techniques may be employed.

The steps of the flowchart 100 may be implemented by one or more software routines, processes, subroutines, modules, etc., as well as by any other means, as applicable.

It should be appreciated that the flowchart 100 is illustrative of merely a broad logical flow of a method in accordance with the principles of the present invention and that steps may be added to, or taken away from, the flowchart 100 without departing from the scope of the present invention. Further, the order of execution of steps in the flowchart 100 may be changed without departing from the scope of the present invention. Additional considerations in implementing the method described by the flowchart 100 in software or otherwise may dictate changes in the selection and order of steps. Some considerations are event handling by interrupt driven, polled, or other schemes. A multiprocessing or multitasking environment could allow steps to be executed essentially concurrently.

When it is desired to reset the system/IC, a reset signal or pulse is provided on the reset pin 54 for the counter and reset circuitry/logic 56, block 102. The counter and reset circuitry/logic 56 generates a PLL reset signal and a digital logic (chip) reset signal in response to the reset signal applied to the pin 54, block 104. The PLL reset signal is applied to the PLL clock synthesizer 60 to disable the generation of an output clock by the PLL clock synthesizer 60 for a predetermined period of time corresponding to the length of the PLL reset signal, block 106. The digital reset signal is applied to the IC digital logic to disable the clocking of the digital logic for a predetermined period of time corresponding to the length of the digital reset signal, block 108.

After a predetermined period of time, the counter and reset circuitry/logic de-asserts the PLL reset signal to the PLL clock synthesizer 60, block 110. This allows the PLL clock synthesizer 60 to provide a clocking signal to the clock generator 68 for internal IC clock generation (clocks 70) by the clock generator 68, block 112. The counter and reset circuitry/logic then de-asserts the digital logic reset signal after a time duration after the PLL reset signal has been de-asserted, block 114, to assure system clock generation before activating the digital logic. Thereafter, the digital logic initiates in a start-up mode, block 116.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In a mixed signal integrated circuit characterized by analog signal circuitry and digital signal circuitry, a method of resetting both the analog signal circuitry and the digital signal circuitry comprising:

providing a master reset signal to the integrated circuit;

generating a clock reset signal of a first predetermined duration in response to the master reset signal, the clock reset signal operable to cease generation of a plurality of system clocks by the analog signal circuitry during the first predetermined duration and to allow generation of the plurality of system clocks by the analog signal circuitry after the first predetermined duration; and generating a digital reset signal of a second predetermined duration in response to the master reset signal, the digital reset signal operable to maintain the digital signal circuitry in an idle state during the second predetermined duration and to cause the digital signal circuitry to start up in a known state after the second predetermined duration, the second predetermined duration being greater than the first predetermined duration.

2. The method of claim 1, wherein the clock reset signal and the digital reset signal are generated simultaneously.

3. The method of claim 2, wherein the clock reset signal is a high going signal and the digital reset signal is a low going signal.

4. The method of claim 1, wherein the master reset signal is an asynchronous signal.

5. The method of claim 4, wherein the asynchronous signal is a low going pulse.

6. The method of claim 1, wherein the second predetermined duration is at least 15% greater than the first predetermined duration.

7. In a mixed signal integrated circuit characterized by both analog signal circuitry and digital signal circuitry, a method of utilizing a single I/O pin for resetting the analog signal circuitry and the digital signal circuitry comprising:

providing a master reset signal via a single I/O pin to clocked counter logic of the integrated circuit;

generating a first reset signal by the clocked counter logic in response to the master reset signal;

providing the first reset signal to an analog signal circuitry phase lock loop for a first predetermined period of time wherein the first reset signal inhibits the phase lock loop from providing an input signal to a clock generator for generating a plurality of system clocks for the integrated circuit;

generating a second reset signal by the clocked counter logic in response to the master reset signal; and providing the second reset signal to the digital signal circuitry for a second predetermined period of time that is greater than the first predetermined period of time wherein the second reset signal puts the digital signal circuitry in an idle state.

8. The method of claim 7, wherein the first reset signal and the second reset signal are generated simultaneously.

9. The method of claim 8, wherein the first reset signal is a high going signal and the second reset signal is a low going signal.

10. The method of claim 7, wherein the master reset signal is an asynchronous signal.

11. The method of claim 10, wherein the asynchronous signal is a low going pulse.

12. The method of claim 7, wherein the second predetermined period of time is at least 15% greater than the first predetermined period of time.

13. The method of claim 7, wherein the first reset signal and the second reset signal have common leading edges that are common to a leading edge of the master reset signal.

14. An integrated circuit comprising:

a phase locked loop operable to produce a clock generation signal;

a clock generator operable to produce a plurality of system clocks in response to the clock generation signal;

digital signal circuitry;

a plurality of I/O pins, a first one of said plurality of I/O pins adapted to accept an input clock signal, and a second one of said plurality of I/O pins adapted to accept a master reset signal; and counter logic in communication with said first and second I/O pins, said counter logic operable to generate a first reset signal in response to receipt of the master reset signal and provide said first reset signal to said phase lock loop for a first predetermined period of time wherein said first reset signal inhibits the phase lock loop from producing the clock generation signal, and to generate a second reset signal in response to receipt of the master reset signal and provide the second reset signal to the digital signal circuitry for a second predetermined period of time that is greater than the first predetermined period of time wherein the second reset signal puts the digital signal circuitry in an idle state.

15. The integrated circuit of claim 14, wherein said first reset signal and said second reset signal are generated simultaneously.

16. The method of claim 15, wherein said first reset signal is a high going signal and said second reset signal is a low going signal.

17. The method of claim 14, wherein the master reset signal is an asynchronous signal.

18. The method of claim 17, wherein the asynchronous signal is a low going pulse.

19. The method of claim 14, wherein the second predetermined period of time is at least 15% greater than the first predetermined period of time.

20. The method of claim 14, wherein the first reset signal and the second reset signal have common leading edges that are common to a leading edge of the master reset signal.

21. An integrated circuit comprising:

a first section for processing an analog signal;

a second section for processing a digital signal; and an input pin for providing a reset signal to the integrated circuit for activating a reset condition of both the first and second sections and for terminating the reset condition of both the first and second sections, wherein the first and second sections are responsive to the reset signal for terminating the reset condition of the first section prior to terminating the reset condition of the second section.

22. The integrated circuit of claim 21, wherein:

the first section comprises an analog phase locked loop disabled during the reset condition of the first section and enabled subsequent to termination of the reset condition of the first section for generating a clock signal;

the reset condition of the second section terminates subsequent to initiation of generation of the clock signal by the analog phase locked loop; and the second section processes the digital signal in response to the clock signal subsequent to termination of the reset condition of the second section.

23. A method of resetting an integrated circuit comprising the steps of:

providing a reset signal to the integrated circuit via a single input pin;

activating a reset condition in an analog signal processing section of the integrated circuit in response to the reset signal;

activating a reset condition in a digital signal processing section of the integrated circuit in response to the reset signal;

terminating the reset condition of the analog signal processing section in response to the reset signal; and terminating the reset condition of the digital signal processing section in response to the reset signal, wherein the reset condition of the analog signal processing section is terminated prior to the termination of the reset condition of the digital signal processing section.

24. The method of claim 23, wherein the reset condition of the analog signal processing section is activated substantially simultaneously with the activation of the reset condition of the digital signal processing section in response to the reset signal.

* * * * *